United States Patent [19]

Sato et al.

[11] Patent Number: 5,337,307
[45] Date of Patent: Aug. 9, 1994

[54] METHOD OF TRACING VIRTUAL PATH OPERATION INFORMATION AND APPARATUS APPLIED THERETO

[75] Inventors: Mutsumi Sato; Motoo Nishihara, both of Tokyo; Haruhiko Matsunaga, Yokosuka; Hiromi Ueda, Yokohama, all of Japan

[73] Assignees: NEC Corporation; Nippon Telegraph & Telephone Corporation, both of Tokyo, Japan

[21] Appl. No.: 975,377

[22] Filed: Nov. 13, 1992

[30] Foreign Application Priority Data

Nov. 13, 1991 [JP] Japan .................................. 3-297407

[51] Int. Cl.$^5$ .......................................... H04L 12/56
[52] U.S. Cl. ...................................... 370/60; 370/94.1
[58] Field of Search ...................... 370/94.1, 13, 85.5, 370/85.15, 60, 60.1, 61, 15, 16, 17, 58.1–58.3

[56] References Cited

U.S. PATENT DOCUMENTS

| | | | |
|---|---|---|---|
| 5,003,533 | 3/1991 | Watanabe | 370/85.5 |
| 5,056,085 | 10/1991 | Vu | 370/60 |
| 5,084,867 | 1/1992 | Tachibana et al. | 370/60 |
| 5,199,027 | 3/1993 | Barri | 370/60 |

OTHER PUBLICATIONS

Matsunaga et al., "Proposed Virtual Path Tracing Function in ATM Networks", (1991) (partial translation).

*Primary Examiner*—Douglas W. Olms
*Assistant Examiner*—Chau T. Nguyen
*Attorney, Agent, or Firm*—Foley & Lardner

[57] ABSTRACT

Virtual path operation information of each of the stations of an synchronous transfer mode telecommunications network is traced using OAM cells. OAM cells used for operation and maintenance control of the asynchronous transfer mode telecommunication network have a pointer indicative of the position where virtual path operation information is recorded and an area for storing virtual path operation information of a certain number of stations. Each station records virtual path operation information in an OAM cell, updates the pointer and sends the OAM cell to the next station on a selected path. When the payload of the OAM cell becomes full, the OAM cell records new OAM cell generation request information and the pointer is changed to the final value and is sent to the next station. A station which receives the OAM cell erases the new OAM cell generation request information, transfers the received OAM cell, generates a new OAM cell, initializes the pointer, and transfers the new OAM cell which has its own virtual path operation information to a next station.

4 Claims, 4 Drawing Sheets

METHOD OF TRACING VIRTUAL PATH OPERATION INFORMATION AND APPARATUS APPLIED THERETO

BACKGROUND OF THE INVENTION

1. Field of the Invention

The present invention relates to an asynchronous transfer mode (ATM) telecommunications system, and more particularly to a method of and an apparatus for tracing virtual path operation information using control monitoring OAM cells.

2. Description of the Prior Art

While no specific method of tracing virtual path operation information in an ATM communications system has been established in the art, one such method using OAM cells (operation and maintenance control data frames) has been proposed by Haruhiko Matsunaga, et al. at the Autumn Conference of the Electronic Information Communication Society, 1991. According to the proposed method, an OAM center instructs a specified station to send an OAM cell for tracing virtual path operation information, and the instructed station generates an OAM cell and sends the OAM cell to a designated destination station through the next station on a selected path to the destination station. Each station on the path which received the OAM cell records its own ID number in the OAM cell, and transfers the OAM cell to the next station. Until the OAM cell reaches the destination station, the stations that receive the OAM cell successively record their ID numbers in the OAM cell. When the destination station receives the OAM cell and records its own ID number in the OAM cell, it delivers the OAM cell to the OAM center, which totalizes the result of virtual path tracing.

SUMMARY OF THE INVENTION

It is an object of the present invention to provide a method of tracing virtual path operation information in a network using a minimum number of OAM cells.

Another object of the present invention is to provide an apparatus for tracing virtual path operation information in a network using a minimum number of OAM cells.

According to the present invention, there is provided a method of tracing virtual path operation information in an asynchronous transfer mode telecommunications network having a plurality of stations each of which, when instructed to trace the virtual path by an operation and maintenance control center, originates and sends a virtual path trace OAM cell bound for a designated destination station, and when receiving the OAM cell, records its own virtual path operation information in the OAM cell and transfers the OAM cell to the next station on a selected path, so that the operation and maintenance control center can trace the virtual path by collecting the OAM cells. The method comprises the steps of determining, in each of the stations, whether there is a request to generate a new OAM cell within the receiving OAM cell, in response to reception of the OAM cell; recording its own virtual path operation information of each station in the OAM cell if there is no request to generate a new OAM cell; thereafter, determining whether there is an area in the OAM cell for storing virtual path operation information of the next station; recording a request in the OAM cell to generate a new OAM cell and transferring the cell to the next station if there is no area for recording virtual path operation information of the next station; generating a new OAM cell after erasing the request to generate a new OAM cell recorded in the received OAM cell in response to detection of the request, recording its own virtual path operation information in the newly generated OAM cell, and transferring the newly generated OAM cell after the received OAM cell to the next station.

According to the present invention, there is also provided an apparatus for tracing virtual path operation information within each telecommunications station in an asynchronous transfer mode telecommunications network having a plurality of stations. When instructed to trace a virtual path by an operation and maintenance center, the invention generates and sends a control monitoring OAM cell bound for a designated destination station, and when receiving an OAM cell, records its own virtual path operation information in the OAM cell and transfers the OAM cell no the next station on a selected path, so that the operation and maintenance center can trace the virtual path by collecting the OAM cells. Each of the stations including: means for determining whether there is a request to generate a new OAM cell within the received OAM cell In response to reception of the OAM cell; means for recording its own virtual path operation information of the station in the OAM cell if there is no request to generate a new OAM cell; means for determining whether there is an area in the OAM cell for recording virtual path operation information of the next station; means for storing a request to generate a new OAM cell in the 0AM cell and transferring the call to the next station if there is no area for storing virtual path operation information of the next station; and means for transferring the received OAM cell having a request to generate a new OAM cell after erasing the request; and means for generating a new OAM cell, recording its own virtual path operation information in the newly generated OAM cell, and sending the newly generated OAM cell after the received OAM cell to the next station.

The OAM cell may have a payload section for storing the virtual path operation information. The payload comprises a virtual path operation information area for storing virtual path operation information of the stations, a data position indicating area for storing pointer information indicative of the position where the present virtual path operation information and that of the final data position are stored, and a new OAM cell generation request area for storing a request to generate a new OAM cell. The means for determining whether there is a request to generate a new OAM cell may comprise means for detecting a request stored in the new OAM cell generation request area. The means for determining whether there is an area for storing information of the next station may comprise means for comparing the pointer information stored in the data position indicating area with a predetermined final data position value. The virtual path operation information may be an ID assigned to each of the stations.

The pointer information may comprise a serial number indicative of a position in the virtual path operation information area, and the final data position value may comprise the final serial number in the virtual path operation information area, The above and other objects, features and advantages of the present invention wall become apparent from the follow description when taken in conjunction with the accompanying drawings which illustrate a preferred embodiment of the present invention by way of example.

DETAILED DESCRIPTION OF A PREFERRED EMBODIMENT

Figure 1:
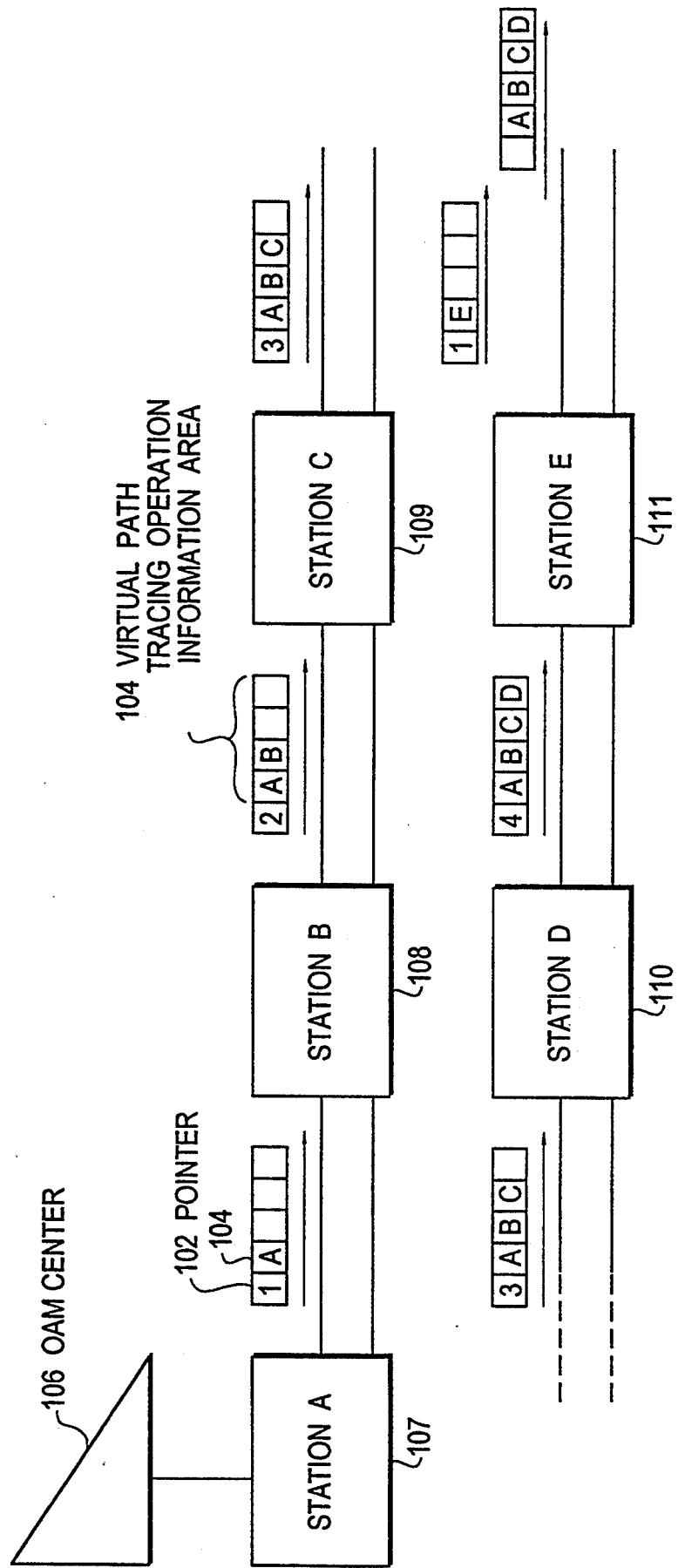
FIG. 1 is a block diagram of an ATM telecommunications system network which employs a method of tracing virtual path operation information, showing the manner in which virtual path operation information is stored in an OAM cell.

FIG. 1 shows an ATM communications system network including an OAM center 106 as an operation and maintenance center, and a plurality of stations 107, 108, 109, 110, and 111. In FIG. 1, OAM center 106 instructs station 107 to generate an OAM cell bound for a designated destination station for virtual path tracing. Station 107 then stores its own ID "A" in the OAM cell and sends the OAM cell to the next station 108 on the selected path. Then the stations 108, 109, 110, and 111 on the selected path similarly record their own IDs "B", "C", "D", "E", respectively, in the received OAM cell, and send the OAM cell on in sequence.

Figure 3:
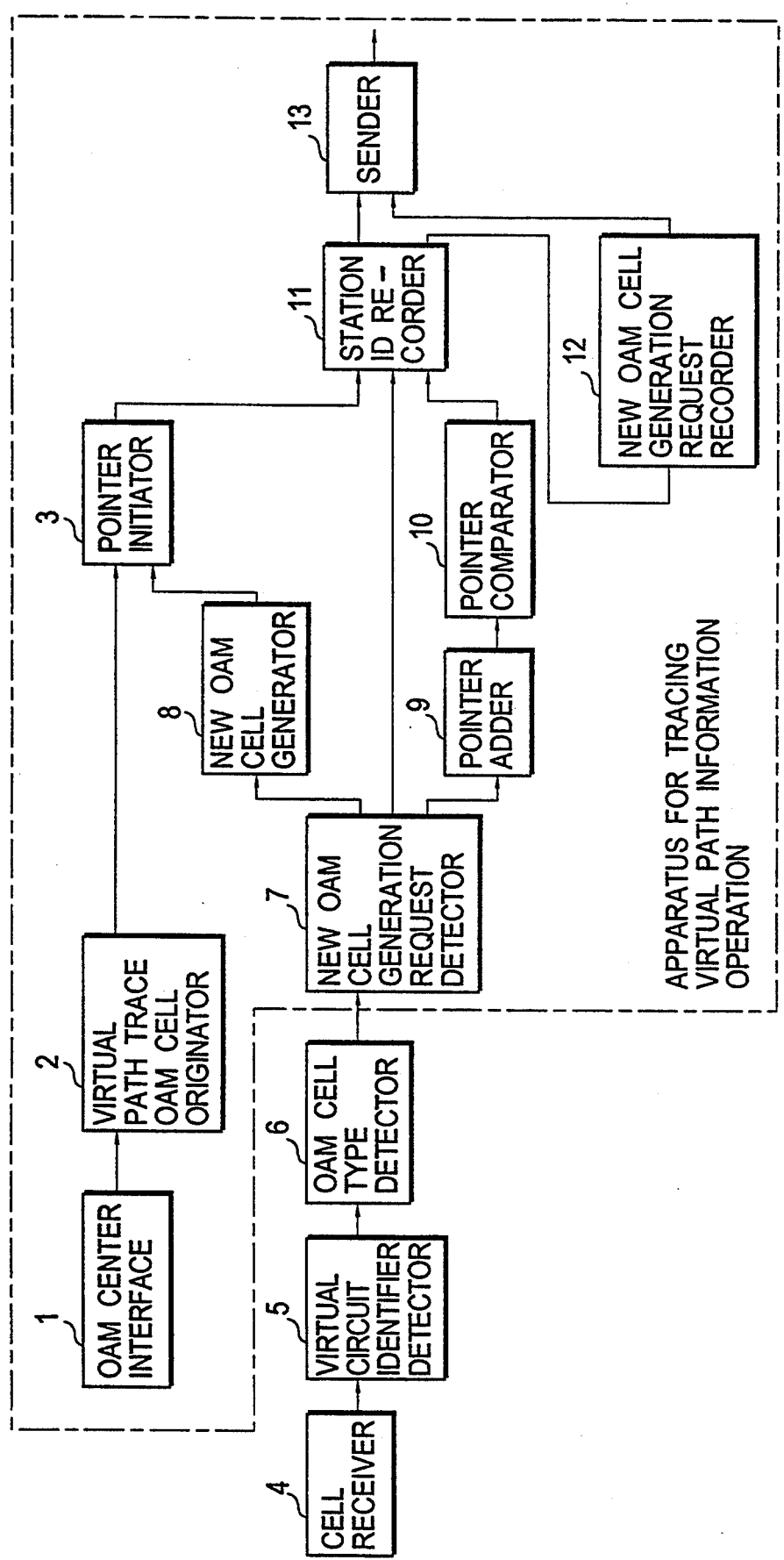
FIG. 3 Shows a block diagram of an embodiment of an apparatus for tracing virtual path operation information based on the present invention.

More specifically, as shown in FIG. 3, each of the stations 107 to 111 has an apparatus for processing the OAM cell. The processing apparatus comprises OAM center interface 1, virtual path trace OAM cell originator 2, pointer initiator 3, cell receiver 4, virtual circuit identifier detector 5, OAM cell type detector 6, new OAM cell generation request detector 7, new OAM cell generator 8, pointer adder 9, pointer comparator 10, station ID recorder 11, new OAM cell generation request recorder 12 and sender 13.

OAM center interface 1 receives an instruction to originate a new virtual path trace OAM cell bound for a designate destination station. Virtual path trace OAM cell originator 2 originates a virtual path trace type OAM cell. Pointer initiator 3 writes "1" into a pointer information area 102 of a payload section of the originated or generated OAM cell as will be described in further detail below in connection with FIG. 2. Cell receiver 4 receives all incoming cells. Virtual circuit identifier detector 5 discriminates an OAM cell from message cell etc.. OAM cell type detector 6 detects the type of OAM cell such as a virtual path trace OAM cell. New OAM cell generation request detector 7 detects a request to generate a new OAM cell in new OAM cell generation request information area 103 as will be described in further detail below in connection with FIG. 2. New OAM cell generator 8 generates a new OAM cell after erasing the request of new OAM cell generation information and transferring the received OAM cell. Pointer adder 9 adds "1" to a pointer of a received OAM cell. Pointer comparator 10 compares the updated pointer with a predetermined final pointer value. Station ID recorder 11 records its own station ID into the successive virtual path operation information area 104 as will be described in further detail below in connection with FIG. 2. New OAM cell generation request recorder 12 records request information into the new OAM cell generation request information area 103 when pointer comparator 10 detects that the updated pointer coincides with the predetermined final pointer value. Sender 13 sends the originated virtual path trace OAM cell and the generated new OAM cell, and transfers the received OAM cell whose necessary information areas are already filled to the next station.

Cell receiver 4, virtual circuit identifier detector 5 and OAM cell type detector 6 are used commonly for all kind of cells.

Figure 2:
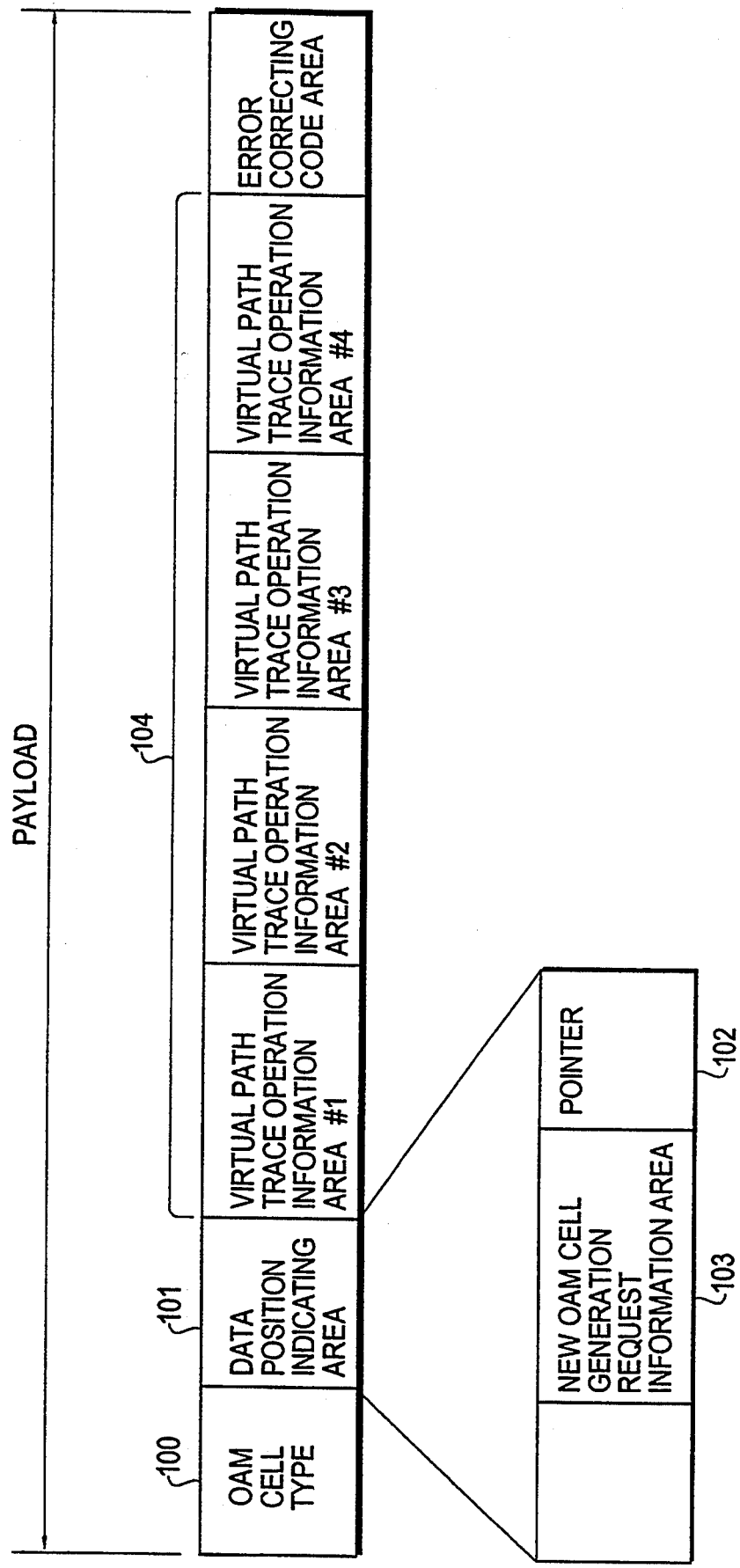
FIG. 2 is an illustration of the format of a payload in the OAM cell shown in FIG. 1.

FIG. 2 shows the format of a payload in the OAM cell shown in FIG. 1.

As shown in FIG. 2, the payload in the OAM cell comprises OAM cell type information area 100 for storing the OAM type information, data position indicating area 101 for indicating the position where data is stored, virtual path operation information area 104 wherein virtual path information of each station recorded and an error correcting code area. Data position indicating area 101 includes pointer information area 102 indicative of a recorded position and new OAM cell generation request information area 103. Virtual path operation information area 104 has virtual path operation information areas #1, #2, #3, #4 corresponding to each of the four stations, as shown in FIG. 1.

Figure 4:
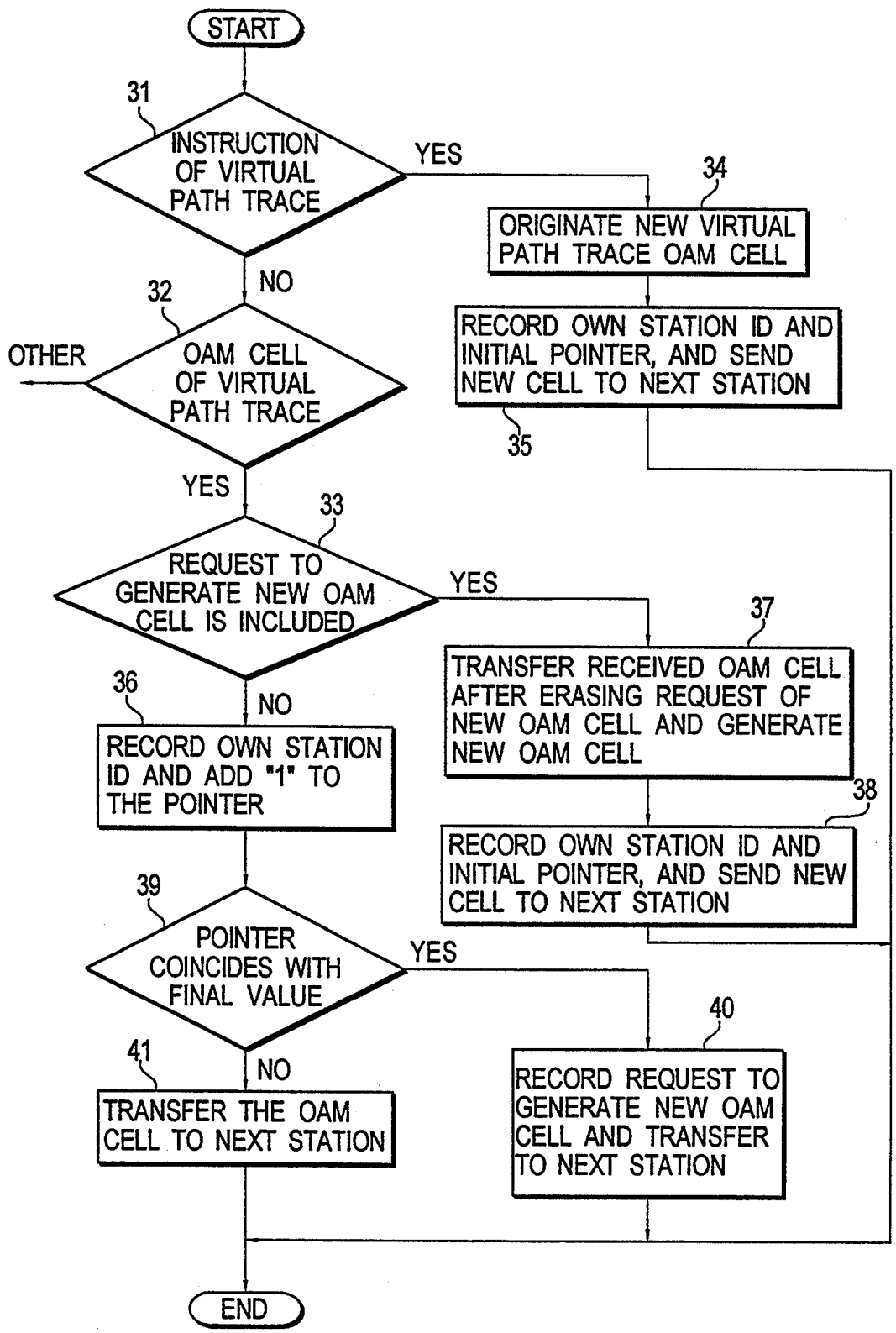
FIG. 4 shows a flow chart of a method of tracing virtual path operation information based on the present invention.

The process of tracing virtual path operation information is described below with reference to FIGS. 1 and 4.

An OAM center instructs station 107 to send an OAM cell bound for a designated destination station to trace virtual path operation information. When station 107 receive the instruction (step 31), station 107 originates a new virtual path trace OAM cell (step 34), and sets a pointer in the OAM cell to an initial value "1" (step 34), records its own station ID "A" in virtual path operation information area #1, and sends the OAM cell to the next station 108 (step 35). When station 108 receives the 0AM cell, judging that it is not an instruction of the OAM center but instead a transferred OAM cell for a virtual path trace and does not include a request to generate a new OAM cell (steps 31, 32, 33), station 108 writes its own ID "B" in virtual path operation information area #2, adds "1" to the pointer and transfers the OAM cell to next station 109, judging that the renewed pointer does not coincide with the final pointer value (steps 33, 36, 39, 41). Similarly, station 109 writes its own ID "C" in virtual path operation information area #3, adding "1" to the pointer, and transfers the OAM cell to next station 110. In this manner, each time the OAM passes through a station, the station adds "1" to the pointer records its own ID in the OAM cell and transfers the OAM cell to the next station until the OAM cell reaches the destination station.

The OAM cell which is received by station 110 has only one empty virtual path operation information area for one station. When station 110 records its own ID "D" in the last empty virtual path operation information area and adds "1" to the pointer, all the available virtual path operation information areas are filled. Therefore, station 110 judging that the pointer information coincides with the final value "4" (step 39), records a new OAM cell generation request in new OAM cell generation request information area 103 in data position indicating area 101 by recording its own ID "D" and then transfers the OAM cell to the next station 111 (step 40).

Station 111 which receives the OAM cell erases the new OAM cell generation request information in area 103 and transfers the OAM cell to the next station, and generates a new OAM cell (step 37), setting the pointer at initial value "1", and transmits the new OAM cell recording its own ID in virtual path operation information area #1 (step 38).

When the OAM cell thus processed by the intermediate stations arrives at the destination station, the destination station records its own ID in the OAM cell, adds "1" to the pointer and transfers the OAM cell to the OAM center. The OAM center can now trace a virtual path from station 107 to the destination station.

With the present invention, as described above, the pointer information indicates the position where virtual path operation information is written. When all of the virtual path operation information area is filled, a new OAM cell is generated according to new OAM cell generating request information, and is transferred by recording virtual path operation information of the station, consecutively. Therefore, it is now possible to use a plurality of OAM cells, allowing a practical process for tracing virtual path operation information without any worry about the number of stations on route.

Although a certain preferred embodiment of the present invention has been shown and described in detail, it should be understood that various changes and modifications may be made therein without departing from the scope of the appended claims.

What is claimed:

1. A method of tracing virtual path operation information in an asynchronous transfer mode telecommunications network having a plurality of stations each of which, when instructed to trace a virtual path by an operation and maintenance control center, originates and sends a virtual path trace OAM cell bound for a destination station, and when receiving a virtual path trace OAM cell, records its own virtual path operation information in the received virtual path trace OAM cell and then transfers the virtual path trace OAM cell to a next station on the virtual path, such that the operation and maintenance control center can trace the virtual path by collecting the virtual path trace OAM cell, said method comprising the steps of:

determining, in each of said stations except for the destination station whether a received virtual path trace OAM cell contains a request to generate an additional new virtual path trace OAM cell;

recording in each of the stations except the destination station, a request to generate an additional new virtual path trace OAM cell in said received virtual path trace OAM cell and transferring said received virtual path trace OAM cell to the next station when there remains no space to enter virtual path operation information for the next station in said received virtual path trace OAM cell;

determining, in each of said stations, whether there is space in said received virtual path trace OAM cell for recording virtual path operation information for a next station;

recording, in each of said stations, a request to generate an additional new virtual path trace OAM cell in said received virtual path trace OAM cell and transferring said received virtual path trace OAM cell to the next station when there is no space in said received virtual path trace OAM cell for recording virtual path operation information for the next station; and generating, in each of said stations except the destination station, an additional new virtual path trace OAM cell after erasing the request to generate an additional new virtual path trace OAM cell when a request to generate an additional new virtual path trace OAM cell is present;

recording, in each of said stations except the destination station, a station's own virtual path operation information into the new virtual path trace OAM cell and transferring the newly generated virtual path trace OAM cell, following the received virtual path trace OAM cell, to the next station; and reporting, from a station listed as the destination station in said received virtual path trace OAM cell, the arrival of the virtual path trace OAM cell to the operation and maintenance control center when receiving the virtual path trace OAM cell.

2. An apparatus for tracing virtual path operation information provided in each telecommunications switching station in an asynchronous transfer mode telecommunications network having a plurality of stations each of which, when instructed to trace a virtual path by an operation and maintenance control center, originates and sends a virtual path trace OAM cell bound for a destination station, and when receiving a virtual path trace OAM cell, records its own virtual path operation information in the received virtual path trace OAM cell and then transfers the virtual path trace OAM cell to a next station on the virtual path, such that the operation and maintenance control center can trace the virtual path by collecting the virtual path trace OAM cell, said apparatus for tracing virtual path operation information comprising:

means for determining whether a received virtual path trace OAM cell contains a request to generate an additional new virtual path trace OAM cell;

means for recording the station's own virtual path operation information into said received virtual path trace OAM cell if there is no request to generate an additional new virtual path trace OAM cell;

means for determining whether there remains space in said received virtual path trace OAM cell for a next station to record virtual path operation information;

means for recording a request to generate an additional new virtual path trace OAM cell in said received virtual path trace OAM cell and for transferring said received virtual path trace OAM cell to the next station if no space remains in said received virtual path trace OAM cell for the next station to record virtual path information;

means for transferring a received virtual path trace OAM cell having a request to generate an additional new virtual path trace OAM cell to the next station, after erasing said request;

means for generating an additional new virtual path trace OAM cell, for recording a station's own virtual path operation information into the newly generated virtual path trace OAM cell, and for sending the new virtual path trace OAM cell, following the received virtual path trace OAM cell, to the next station; and means for reporting the arrival of a virtual path trace OAM cell from a station which is listed as the destination station.

3. An apparatus according to claim 2, wherein said virtual path trace OAM cell has a payload section for storing the virtual path operation information, the payload section comprising a plurality of virtual path operation information areas for storing the virtual path operation information of each station along the virtual path, a data position indicating area for storing a pointer indicative of the position where the last virtual path operation information was entered, and a new virtual path trace OAM cell generation request information area for storing a request to generate a new virtual path trace OAM cell, and wherein the means for determining whether a received virtual path trace OAM cell contains a request to generate an additional new virtual path trace OAM cell comprises means for detecting a request stored in the new virtual path trace OAM cell generation request information area, and said means for determining whether there is space in the received virtual path trace OAM cell for a next station to record virtual path information comprises means for comparing a pointer stored in the data position indicating area with a total number of areas of virtual path operation information in a virtual path trace OAM cell.

4. An apparatus according to claim 3, wherein said pointer comprises a serial number which is numbered to each virtual path operation information area.

* * * * *